Jan. 17, 1967    F. G. KERBY ET AL    3,298,733
MULTI-PURPOSE VEHICLE BODY
Filed Oct. 23, 1964    3 Sheets-Sheet 1

INVENTORS
FLOYD G. KERBY
ERWIN B. KOLT
BY John B. Sowell
ATTORNEY

Jan. 17, 1967   F. G. KERBY ET AL   3,298,733
MULTI-PURPOSE VEHICLE BODY
Filed Oct. 23, 1964   3 Sheets-Sheet 2

INVENTORS
FLOYD G. KERBY
ERWIN B. KOLT
BY
John B. Sowell
ATTORNEY

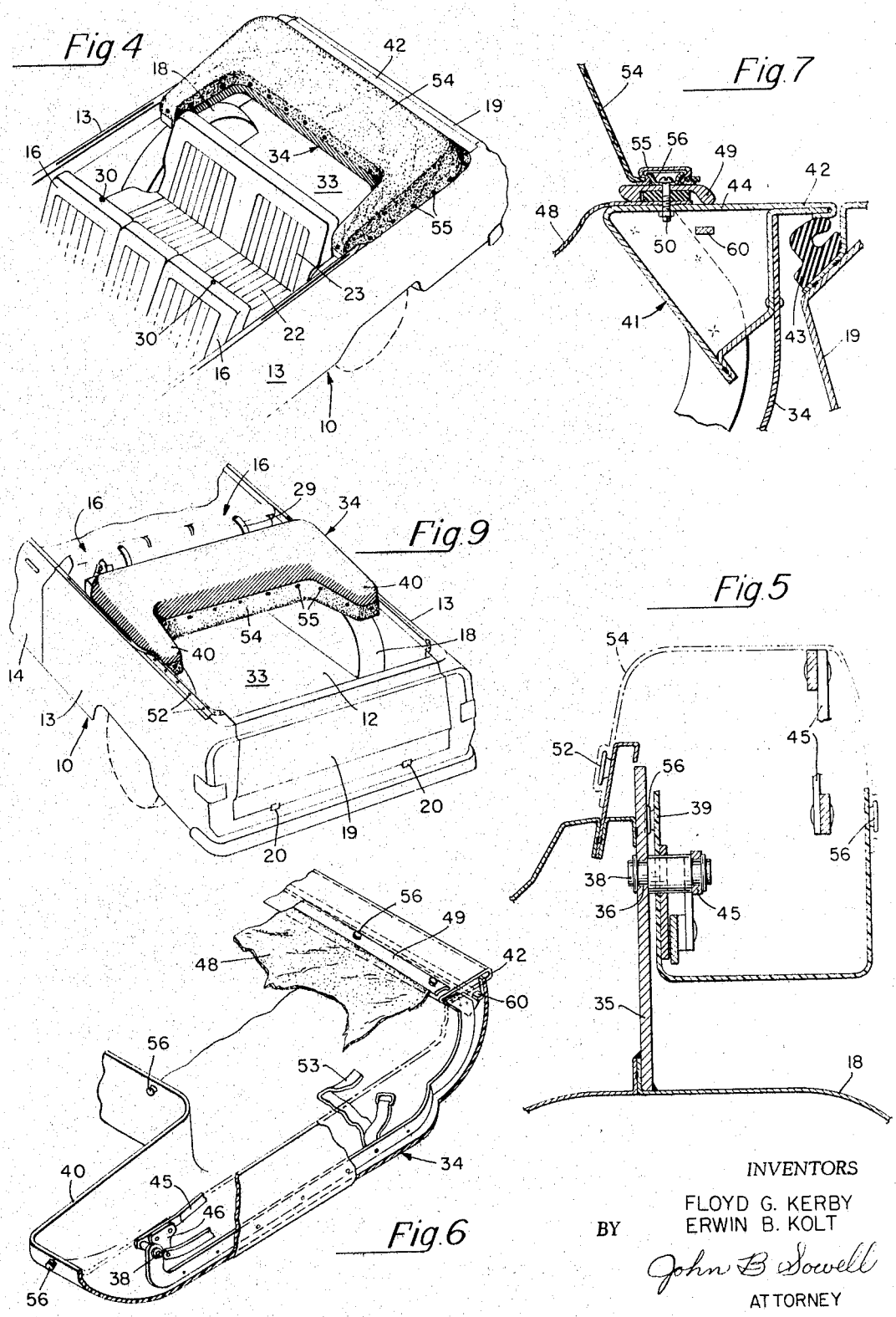

United States Patent Office 3,298,733
Patented Jan. 17, 1967

3,298,733
MULTI-PURPOSE VEHICLE BODY
Floyd G. Kerby, Grosse Pointe Woods, and Erwin B. Kolt, Birmingham, Mich., assignors to The Budd Company, Philadelphia, Pa., a corporation of Pennsylvania
Filed Oct. 23, 1964, Ser. No. 405,918
9 Claims. (Cl. 296—108)

This invention relates to a multipurpose vehicle body, and more particularly to a vehicle body which in many respects resembles a conventional station wagon but which has a collapsible top.

One of the disadvantages of the conventional station wagon is that by reason of its fixed roof only articles of a limited type can be transported therein.

One of the objects of the present invention is to provide a vehicle body having the advantages of a conventional station wagon and having the further object that articles of a greater height can be transported therein.

Another object is to provide a vehicle body having the advantages of a conventional station wagon, but in which the top thereof is collapsible and so arranged and supported as not to interfere with the use of the body in a manner similar to that of a station wagon.

A further object is to provide a vehicle body having a collapsible top which is supported by and stowable in collapsed condition in a structure so arranged in the vehicle body as to be movable between different positions.

A still further object is to provide a vehicle body having a collapsible top with a structure supporting the top and into which the top can be collapsed and stored, and which can be moved from a position overlying a storage space to another position whereby to make such space available for the reception of articles of a height greater than normally would be possible.

With the above and other objects in view, the present invention consists in certain features of construction and combinations of parts to be hereinafter described with reference to the accompanying drawings, and then claimed.

In the accompanying drawings which illustrate a suitable embodiment of the present invention, FIGURE 1 is a side view of a vehicle body with portions broken away to show the movable member which supports a collapsible top and which carries the top in collapsed stowed condition;

FIGURE 3 is a section taken on the line 3—3 of FIGURE 2;

FIGURE 4 is a perspective view of the rear portion of the body showing the same in condition for use as a touring car;

FIGURE 5 is a cross-sectional view taken on the line 5—5 of FIGURE 2;

FIGURE 6 is a fragmentary perspective view of the top-receiving pan-like structure;

FIGURE 7 is an enlarged view of that portion of the structure shown within the broken line area of FIGURE 3;

FIGURE 9 is a perspective view of the body showing the top-receiving pan-like structure in its inverted position.

Figure 1:
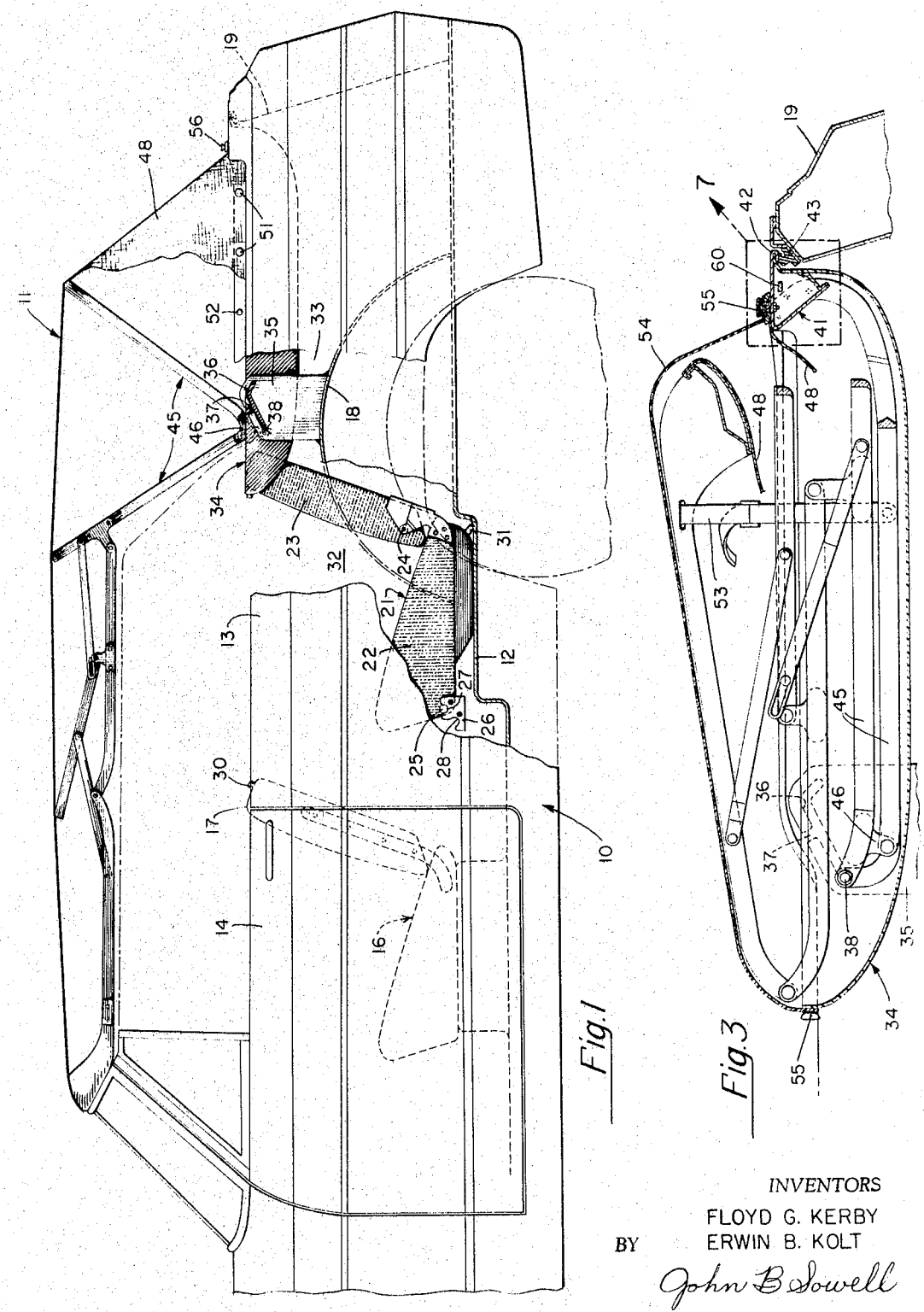

Referring to the accompanying drawings in which like numerals refer to like parts throughout the several views, the vehicle body 10 shown for the purpose of illustration is of the open type, that is, the type conventionally known as a convertible body having a collapsible top 11. The body has a floor 12, sides 13, doors 14 in the sides 13 opening into the driver's compartment 15 containing front seats 16 having a back 17, rear wheel housing 18 extending inwardly from the sides 13, and a tail gate 19 extending between the sides 13 and hinged at 20, as shown in FIGURE 8, to the floor 12.

Figure 8:
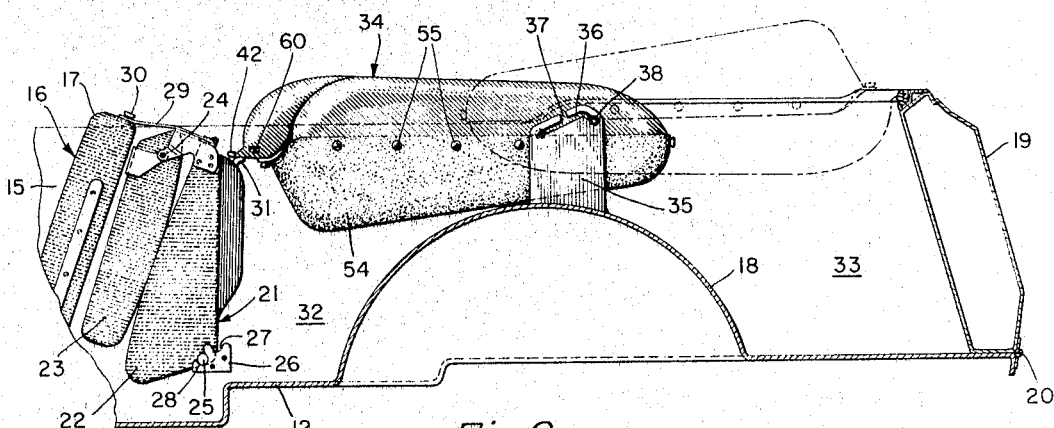
FIGURE 8 is a longitudinal sectional view showing the rear seat in folded position and showing the top-receiving pan-like structure in an inverted position.

Rearwardly of the front seat 16 there is a rear seat 21 having a seat cushion 22 and a back 23 which is hinged at 24 whereby it may be moved to a folded position against the cushion 22, as shown in FIGURE 8. The seat in its usable position, as shown in FIGURE 1, rests upon the floor 12, and at its forward end is provided with hinge pins 25 which support the forward end upon brackets 26 having upper and lower hinge pin depressions 27 and 28 respectively. In the in-use position of the seat 21 the hinge pins 25 seat in the upper depressions 27.

When it is desired to move the rear seat 21 to a folded, upright, non-use position, as indicated in FIGURE 8, adjacent the back of the front seat 16, the seat is moved forwardly to engage the hinge pins 25 within the lower depressions 28. In the folded upright position, as shown in FIGURE 8, the rear seat 21 is held in this position by means of straps 29 which are connected with buttons 30 on the front seat back 17, or by any other suitable restraining means.

It is to be noted that the bottom portion of the seat 21 is provided with an extending ledge 31 for a purpose to be hereinafter described.

In the in-use position, the rear seat back 23 divides the space between the front seat back 17 and tail gate 19 into a passenger compartment 32 and a storage compartment 33.

In accordance with the present invention, a movable, horizontal pan or pan-like structure 34 is provided to overlie, in what may be termed a normal position, a portion of the storage compartment space 33. This pan, in plan view, as illustrated in the several views, is generally of U-shape.

Carried by the wheel housings 18 are upstanding pan-supporting plates 35, each of which has an inclined slot 36 and is recessed or cut away at 37 to provide access to a slot 36.

The pan-like structure 34 is pivotally or hingedly supported by the plates 35 by means of pins 38 which extend through the outer walls 39 of the legs or arms 40 of the pan-like structure 34 as shown in FIGURE 5. The pins 38 are insertable into the slots 36 through the cut-away openings 37.

Figure 2:
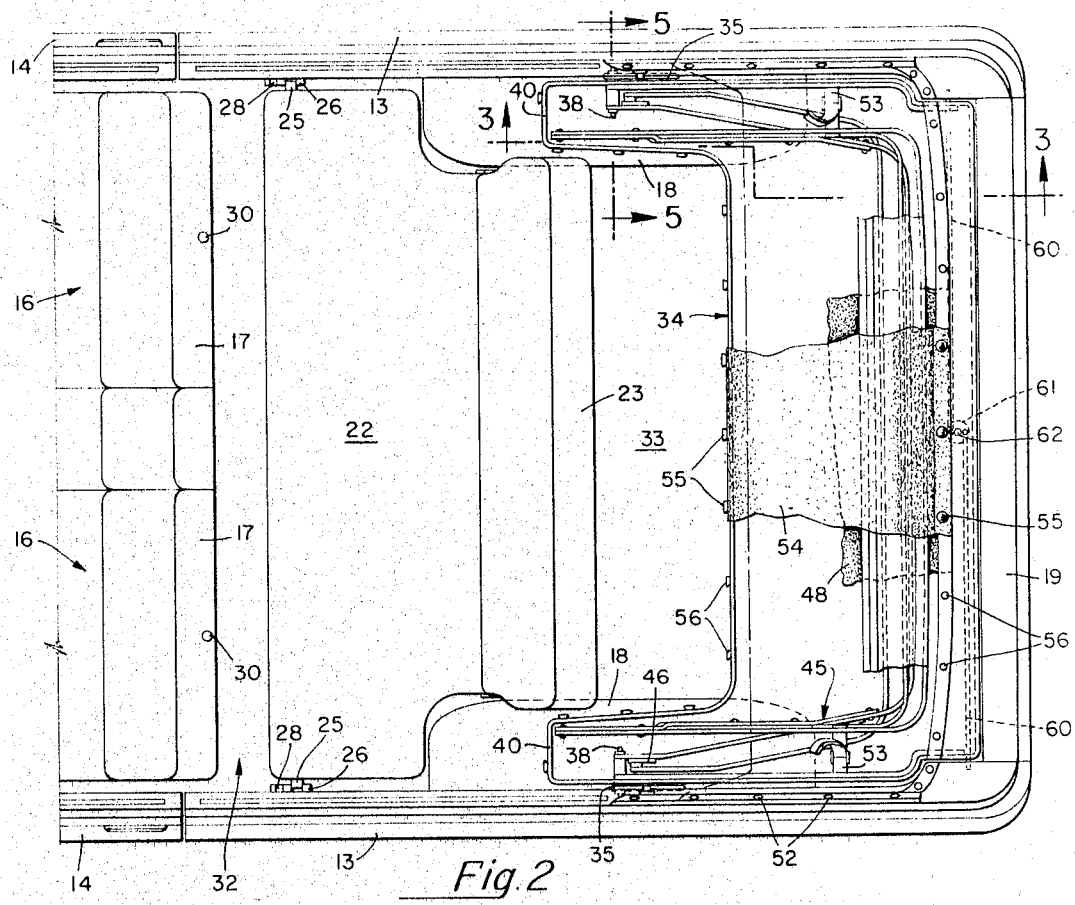
FIGURE 2 is a plan view of the vehicle body with the top in collapsed and stowed condition.

The pan-like structure 34, along its rearward edge is provided with a hollow reinforcing member 41, as shown in FIGURE 7. Interiorly of the member 41 there is a locking device comprising rod members 60 pivotally connected with the opposite sides of a key-operated rotatable member 61 (FIGURE 2), there being an opening 62 in member 41 for the reception of a key (not shown). The rod members 60 extend through openings in the pan-like structure 34 and engage with openings in body side-walls to support the rearward portion of the pan-like structure. By inserting a key in the opening, the rotatable member 61 can be rotated to retract the rod members 60 whereby the pan-like structure 34 can be pivotally moved about the pivot pins 38.

The reinforcing member 41 provides a rearwardly extending, flange-like portion 42 which rests upon a resilient weather seal 43 carried by the top side of the tail gate 19. The member 41 also provides a forwardly extending surface 42 for a purpose to be later described.

The top 11 is of the conventional convertible type embodying a number of linkages and includes rear top bows 45, one of which is pivoted at its depending ends to brackets 46 secured to the other bow. The depending ends of the other bow 45 are pivoted on the pivot or hinge pins 38 which also support the pan-like structure 34. In the in-use position, the forward end of the top 11, as in conventional practice, is supported by the body windshield 47. The rear portion of the top covering material 48 is secured to the surface 44, as shown in FIGURES 6 and 7, by means of a clamping strip 49 and bolts 50. In the in-use condition of the top 11 the depending side portions of the top covering 48 are removable attached to the sides of the body by snap fasteners 51, as shown in FIGURE 1, which engage with fastener buttons 52.

With the snap fasteners disengaged from buttons 52 the top 11 is collapsible into a stowed position in the pan-like structure 34 as shown in FIGURE 3. The collapsed top structure is held in collapsed, stowed position by straps 53 carried within the pan-like structure 34.

It is to be understood that the present invention does not reside in the top structure per se and that any top structure capable of being supported by and moved in a collapsed condition into the pan-like structure 34 may be used.

If desired, a flexible boot 54, when the top 11 is in stowed position, may be used for the sake of appearance and as a dust shield and is provided with snap fasteners 55 for engagement with buttons 56 on the pan-like structure 34.

Disregarding the boot 54 for the moment, and with the rear seat 21 folded and in the upright position shown in FIGURE 8, the pan-like structure 34, with the top 11 in its stowed condition as shown in FIGURE 3, is pivotally movable to an inverted position to overlie the passenger compartment 32. In this position, the pins 38 bottom against the upper ends of the slots 36 whereas in the position shown in FIGURE 1 they bottom against the lower ends of the slots 36. Also in the inverted position, the flange-like portion 42 of the pan-like structure 34 seats on the extending ledge 31 carried by the seat 21 as shown in FIGURE 8 to support the pan-like portion 34 in a horizontal position.

The pan-like structure 34 and top 11 in its collapsed and stowed condition constitute a unit assembly which may be bodily removed as such by aligning the pivot pins with the cut-outs 37 and lifting this assembly therefrom, whereby the vehicle may be used as a topless pick-up vehicle, with the seat 21 in the position shown either in FIGURE 1 or in FIGURE 8.

With the pan-like structure 34 in the storage compartment-overlying position, the vehicle with a body of the present invention may be used as a conventional passenger vehicle of the touring car type, either with the top 11 raised as shown in FIGURE 1, or with the top 11 lowered and in collapsed, stored condition as shown in FIGURE 4. In this case, it is to be noted that access may be had to the storage compartment 33 from within the body of reason of the U-shaped pan-like structure 34, or through the tail gate 19 when the latter is in lowered position.

With the U-shaped pan-like structure 34 in the inverted position as shown in FIGURE 9, the body may be used for the transportation of articles of greater height than the distance between the floor 12 and the top 11. Space also is provided underneath the inverted pan-like structure 34 for the storage of articles.

When the pan-like structure 34 is in the position shown in FIGURE 4 certain of the snap fasteners 55 on the boot 54 are snapped over the buttons 51 on the outer sides of the body whereby to provide a neat appearance.

The vehicle body of the present invention has all of the advantages of the so-called station wagon, but has the further advantages that the top may be stored whereby the vehicle may be used to transport articles of a height greater than is permissible in a conventional station wagon.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What I claim is:

1. In a convertible type automobile body having a driver's compartment, a rear storage compartment, an intermediate compartment, and a foldable seat in said intermediate compartment, the combination comprising
    (a) a horizontal pan movable from a position overlying said storage compartment to a position overlying said intermediate compartment when said seat is in folded condition,
    (b) means for supporting said pan in both said positions,
    (c) a collapsible top for said body having rearward supporting elements, and
    (d) means pivotally connecting said top-supporting elements to interior side walls of said pan, said top being collapsibly movable to a stored condition within said pan,
    said pan with said top in collapsed, stored position therein, when in position overlying said intermediate compartment permitting free access to said storage compartment.

2. In a convertible type automobile body having a driver's compartment, a rear storage compartment, and an intermediate compartment between said first mentioned compartments, the combination comprising
    (a) a horizontal pan overlying said storage compartment,
    (b) supports carried by said body,
    (c) means for hingedly supporting said pan at its forward position on a horizontal axis on said supports,
    (d) means for supporting said pan rearwardly of said horizontal axis, and
    (e) a collapsible top for said body, said top having rearward supporting elements hingedly connected to said pan, and being movable into a collapsed stored condition within said pan,
    said pan with said top in stored condition being swingable about said horizontal axis to a position overlying said intermediate compartment.

3. An automobile body as defined in claim 2, having a hinged vertical tail gate, the upper edge of said tail gate being engagable with said pan when said pan overlies said storage compartment.

4. An automobile body as defined in claim 2 in which the means for hingedly supporting said pan are removable from said supports, whereby said pan with said top in its collapsed stored condition may be removed as a unit from said body.

5. An automobile body as defined in claim 2 including a front seat in said driver's compartment and a collapsible seat in said intermediate part, said collapsible seat in collapsed condition being hingedly movable to an upright position adjacent said front seat, said collapsible seat in its upright position constituting a support for said pan when in its inverted position.

6. In a convertible type automobile body having a driver's compartment, a seat in said driver's compartment, a passenger compartment, a seat in said passenger compartment, a storage compartment rearwardly of said passenger compartment seat, and a tail gate at the rear of said storage compartment, said passenger compartment seat being foldable and movable in folded condition to an upright position adjacent the back of the driver's compartment seat, the combination therewith of
    (a) a recessed, horizontal pan overlying said storage compartment with a rearward portion thereof engaging said tail gate and overlying said storage compartment, (b) means for pivotally supporting the opposite ends of said pan at the forward portion thereof,
(c) a collapsible top for said body having supporting bows, and
(d) means for pivoting connecting one of bows to the opposite ends of said pan interiorly thereof, said top being movable in collapsed stored condition into said pan, said pan with said top in stored condition being movable about the axes of the pivotally supporting means to an inverted position overlying said passenger compartment, said passenger compartment seat when in its folded upright position being adapted to supporting said pan in its inverted position.

7. An automobile body as defined in claim 5 in which said pan, as viewed from above when in its storage compartment-overlying position is of U-shape, the arms of which terminate adjacent the passenger compartment seat, the space between said arms providing air access opening to said storage compartment.

8. A pan-like structure having a recess and connected to overlie the storage compartment of a convertible type automobile body in one position and being movable to another position to provide access to the storage compartment, the combination therewith of a collapsible vehicle top having a supporting element, and means pivotally connecting said supporting element to the ends of said pan-like structure, said vehicle top and supporting element being collapsible and movable into a stored position within the recess of said pan-like structure, said pan-like structure and top constituting a unit assembly.

9. The unit assembly as defined in claim 8 including means carried by said pan-like structure for holding said top, when in collapsed condition, in stored condition.

References Cited by the Examiner
UNITED STATES PATENTS

| | | | |
|---|---|---|---|
| 2,711,924 | 6/1955 | Orr | 296—107 |
| 3,053,567 | 9/1962 | Geiger | 296—107 |

MILTON BUCHLER, *Primary Examiner*

BENJAMIN HERSH, *Examiner.*

P. GOODMAN, *Assistant Examiner.*